US012698198B2

(12) United States Patent
Murphy et al.

(10) Patent No.: US 12,698,198 B2
(45) Date of Patent: Aug. 4, 2026

(54) BEVERAGE DISPENSE APPARATUS

(71) Applicant: Diageo Ireland Unlimited Company, Dublin (IE)

(72) Inventors: Christopher Murphy, Dublin (IE); Gerald Gillen, Dublin (IE); James Ryan, Dublin (IE); Haris Velagic, Dublin (IE); Paul Smith, Essex (GB); Stephen Hendron, London (GB); Steve Gilsenan, Dublin (IE); Alan Johnston, Dublin (IE)

(73) Assignee: Diageo Ireland Unlimited Company, Dublin (IE)

( * ) Notice: Subject to any disclaimer, the term of this patent is extended or adjusted under 35 U.S.C. 154(b) by 119 days.

(21) Appl. No.: 18/289,930

(22) PCT Filed: May 17, 2022

(86) PCT No.: PCT/EP2022/063333
§ 371 (c)(1),
(2) Date: Nov. 8, 2023

(87) PCT Pub. No.: WO2022/243322
PCT Pub. Date: Nov. 24, 2022

(65) Prior Publication Data

US 2025/0002325 A1 Jan. 2, 2025

(30) Foreign Application Priority Data

May 17, 2021 (GB) ..................................... 2107014

(51) Int. Cl.
*B67D 3/00* (2006.01)

(52) U.S. Cl.
CPC ......... *B67D 3/0061* (2013.01); *B67D 3/0035* (2013.01); *B67D 3/0077* (2013.01); *B67D 3/009* (2013.01)

(58) Field of Classification Search
CPC ........ B67D 1/0888; B67D 1/12; B67D 1/127; B67D 1/1272; B67D 1/1275; B67D 1/14;
(Continued)

(56) References Cited

U.S. PATENT DOCUMENTS 2,049,541 A 8/1936 Hatchel
2,246,693 A 6/1941 Ohme
(Continued)

FOREIGN PATENT DOCUMENTS

CN 102689867 9/2012
CN 204211473 3/2015
(Continued)

*Primary Examiner* — Hung D Nguyen
(74) *Attorney, Agent, or Firm* — Stephen T. Scherrer; Monique A. Morneault; Scherrer Patent & Trademark Law, P.C.

(57) ABSTRACT

A beverage dispense apparatus and associated method, comprises a frame (11) for removably locating and holding a sealed beverage unit package (C) in a vertical orientation. A first piercing element (14) punctures a vent opening into a headspace of the beverage package (C) and, subsequently as the first piercing element is driven downward, a second piercing element (15) punctures an outlet opening into the beverage package so that beverage can flow through a nozzle (17) under gravity. An ultrasonic transducer (16) against the nozzle (17) may supply excitation energy that breaks gas out of solution so that a creamy head is formed on the beverage in a delivery vessel underneath the frame. Control of the vent opening/vale (13) enables flow to be slowed or stopped through the nozzle (17) enabling a settle time and “two-part” pour.

22 Claims, 6 Drawing Sheets

(58) Field of Classification Search
CPC ...... B67D 1/1411; B67D 1/1416; B67D 3/00; B67D 3/0029; B67D 3/0035; B67D 3/0051; B67D 3/0054; B67D 3/0061; B67D 3/0077; B67D 3/009; B67D 2001/0812; B67D 2001/0087
See application file for complete search history.

(56) References Cited

U.S. PATENT DOCUMENTS

| | | | | |
|---|---|---|---|---|
| 2,655,286 | A | 10/1953 | Barbaro | |
| 3,926,339 | A * | 12/1975 | Openchowski | B67B 7/28 222/530 |
| 9,068,566 | B2 | 6/2015 | Ivri | |
| 9,565,870 | B2 | 2/2017 | Deo et al. | |
| 9,856,123 | B1 | 1/2018 | Mantz | |
| 2008/0105130 | A1* | 5/2008 | Koeling | A47J 31/40 99/279 |
| 2009/0178716 | A1 | 7/2009 | Kaduchak et al. | |
| 2009/0229699 | A1 | 9/2009 | Arcuri | |
| 2009/0294473 | A1 | 12/2009 | Frey | |
| 2010/0133708 | A1 | 6/2010 | Fischer | |
| 2013/0108748 | A1 | 5/2013 | Deo et al. | |
| 2014/0182743 | A1 | 7/2014 | Trulaske et al. | |
| 2018/0362326 | A1 | 12/2018 | Jarrousse et al. | |
| 2018/0370785 | A1 | 12/2018 | Huang | |
| 2019/0127199 | A1 | 5/2019 | Ozawa et al. | |
| 2020/0000844 | A1 | 1/2020 | Neuwelt et al. | |
| 2020/0148986 | A1 | 5/2020 | Kano et al. | |
| 2020/0231426 | A1 | 7/2020 | Edwards et al. | |
| 2020/0247662 | A1 | 8/2020 | Wade et al. | |
| 2020/0391991 | A1 | 12/2020 | Curgy et al. | |
| 2020/0399111 | A1 | 12/2020 | Gant et al. | |
| 2021/0024334 | A1 | 1/2021 | Fischer et al. | |
| 2021/0163276 | A1 | 6/2021 | Clifton | |
| 2021/0380395 | A1 | 12/2021 | Harr | |
| 2022/0289550 | A1 | 9/2022 | Murphy et al. | |

FOREIGN PATENT DOCUMENTS

| | | | | |
|---|---|---|---|---|
| CN | 204251325 | | 4/2015 | |
| CN | 204310809 | | 5/2015 | |
| CN | 204508784 | | 7/2015 | |
| CN | 204625159 | | 9/2015 | |
| CN | 2046255157 | | 9/2015 | |
| CN | 103429934 | | 3/2016 | |
| CN | 205527704 | | 8/2016 | |
| CN | 106175492 | | 12/2016 | |
| CN | 206126822 | | 4/2017 | |
| CN | 105270769 | | 5/2017 | |
| CN | 206239224 | | 6/2017 | |
| CN | 105270768 | | 7/2017 | |
| CN | 206735035 | | 12/2017 | |
| CN | 206886656 | | 1/2018 | |
| CN | 20698569 | | 2/2018 | |
| CN | 208218390 | | 12/2018 | |
| CN | 209080649 | | 7/2019 | |
| CN | 211469449 | | 9/2020 | |
| CN | 111777026 | | 10/2020 | |
| CN | 109689565 | | 12/2020 | |
| CN | 213202354 | | 5/2021 | |
| CN | 110914192 | | 8/2021 | |
| CN | 215015887 | | 12/2021 | |
| CN | 215756409 | | 2/2022 | |
| CN | 215798473 | | 2/2022 | |
| CN | 215798474 | | 2/2022 | |
| CN | 215798475 | | 2/2022 | |
| CN | 215798476 | | 2/2022 | |
| CN | 115258425 | | 11/2022 | |
| CN | 217708877 | | 11/2022 | |
| CN | 114101013 | | 2/2023 | |
| DE | 202018002132 | U1 * | 5/2018 | B67D 1/0804 |
| EP | 0424682 | | 5/1991 | |
| EP | 3674256 | | 7/2020 | |
| EP | 3517488 | | 12/2022 | |
| EP | 3517489 | | 12/2022 | |
| EP | 3674255 | | 12/2022 | |
| EP | 3674257 | | 12/2022 | |
| GB | 2387835 | | 10/2003 | |
| GB | 2398728 | | 9/2004 | |
| NL | 1017859 | | 10/2002 | |
| NL | 1017859 | C2 * | 10/2002 | B67D 3/0029 |
| WO | 03033397 | | 3/2003 | |
| WO | 12100205 | | 7/2012 | |
| WO | 15005474 | | 1/2015 | |
| WO | 17195541 | | 11/2017 | |
| WO | 18066703 | | 4/2018 | |
| WO | 20030418 | | 2/2020 | |
| WO | 20138099 | | 7/2020 | |
| WO | WO-2020138099 | A1 * | 7/2020 | B67D 1/1416 |
| WO | 2021032885 | | 2/2021 | |
| WO | 21224515 | | 11/2021 | |
| WO | 22243322 | | 11/2022 | |

* cited by examiner

BEVERAGE DISPENSE APPARATUS

TECHNICAL FIELD

The present invention relates to an apparatus for beverage dispense. The apparatus and its corresponding method replicate draught dispense in a compact device and, in one form, enables forming of a head on the beverage during/following the dispense process. A beverage of the type relevant to the invention will includes gas in solution, such as carbon dioxide, nitrogen, a combination thereof or any other inert gas suitable for the purpose. The beverage may be alcoholic or non-alcoholic, but the present invention is particularly suited for use with beverages such as cider, cocktails, beer, lager, ale and stout, where the presence of a head on the beverage when it is presented to the consumer in a drinking vessel is traditional and desirable.

BACKGROUND TO THE INVENTION

The most common method of delivering beer to a consumer is by way of draught dispense from a keg (i.e. a large volume/bulk container with multiple servings) or single unit packages such as aluminium cans and glass bottles. Draught dispense is generally only possible in a public house/restaurant environment since dispense equipment is expensive and requires maintenance. However, it is not always possible for a bar or similar outlet to store beverages in bulk containers such as kegs, due to space and cost constraints. The space needed to store kegs is significant, and the associated dispensing and chilling equipment also involves significant cost for the proprietor and may not be justified where there is a relatively low volume of sales. Many establishments therefore sell beverages stored in bottles or cans, which are usually kept in display fridges behind the bar. Single unit packages are also commonly available for home use.

Draught dispensers rely on gas under pressure to deliver beverage from the keg to a drinking vessel such as a pint glass. Gas pressure can be further utilised to force the beverage through a multi-aperture "creamer plate" which encourages dissolved gas out of solution and, particularly in connection with nitrogenated beers, results in a creamy head being produced in the glass for serving. A creamer plate is not desirable in the context of a lager or other purely carbonated beverage because it causes excessive frothing and a head which is too large and obstructive for comfortable consumption.

Use of conventional single unit packaging cannot reproduce the head of a draught dispense system unless an additional device/feature is employed to mimic the effect. A common device used for mimicking a draught pour head is a so-called "widget", in one form being a hollow plastic device inserted into the can or bottle during filling, to float on the surface of the beverage of a sealed can. An internal volume of the widget is pressurised during the filling process and, upon opening the beverage package, a pressure differential causes a jet of gas/beverage to be released into the main volume of beverage, triggering nucleation of the dissolved gas to bubble out of solution.

Widgets are widely available and accepted in the marketplace but add expense and time to the manufacturing process along with resultant plastic waste/impact on recyclability as the widget is left behind in a used beverage container.

Alternative single serve head producing methods are known. For example, ultrasonic excitation in a platform upon which a filled beverage container (e.g. glass) can sit, will produce or increase a head on a beverage. WO2004011362 describes such a device. The ultrasonic excitation causes cavitation of the liquid which encourages the gas in the liquid to come out of solution and thus forms as tiny bubbles which migrate to the surface of the liquid, forming a head of froth on the surface. The equipment required, e.g. a conductive platform in contact with an transducer, is relatively straightforward and does not require much space; therefore it is suitable for use at home or in establishments of the type discussed above, which stock only bottled or canned beverages and which may have space constraints. However, ultrasonic platforms are not suitable for achieving a "two-part" pour and are subject to inconsistency due to thickness of glass, etc.

Further ultrasonic devices are known to assist foaming in beverage products. For example, "bubbler" devices have been proposed that couple to the opening end of an aluminium can package. A beverage, e.g. carbonated lager, is poured through the bubbler device where it is subjected to ultrasound, enhancing froth formation as it is delivered to a glass. The pour can drain the pack all at once, with ultrasound/foam applied by the press of a button when needed, or in multiple pours so long as carbon dioxide remains dissolved in the liquid.

Generally, available ultrasonic foam-producing methods require the user to learn a new delivery procedure, distant from a traditional tap pouring system where a glass is positioned and filled from underneath a dispense nozzle.

SUMMARY OF THE INVENTION

The present invention seeks to provide an alternative apparatus, method and system of beverage dispense for single serve volumes to a consumer. Single serve refers to a canned or bottled product, as distinct from a kegged beverage. The invention presents a useful alternative to replicate at least the appearance of draught dispense in a compact device that may be affordable for home or low-volume bar use.

In a broad aspect the apparatus of the invention is defined herein. A method according to the invention is also herein.

It is envisaged that the invention will provide an improved apparatus and accompanying method for forming a desirable head on a beverage and/or, indeed, a general novel dispense system replicating draught dispense in a compact device not necessarily applied only to beverages requiring head formation. In preferred forms the apparatus should be simple to use and does not require the user to perform multiple operations or, at least, minimises maintenance operations. The user may therefore be relatively unskilled and the process easily repeatable to ensure a consistent quality of serve.

The invention may take the form of a beverage dispense apparatus comprising a receiving feature or means, e.g. a cradle/holder/support/frame/clamp, for locating and supporting opposite ends of a beverage package, e.g. in an inverted configuration. In one form the receiving structure is configured to locate the beverage package above a delivery vessel, e.g. a pint glass, such that gravity assists dispense into said vessel.

The invention may be expressed as a beverage dispense apparatus, comprising: a receiving structure for removably locating and holding a sealed beverage package, e.g. over a delivery vessel; a dispense nozzle for dispensing beverage therethrough; a first piercing element configured for puncturing a vent opening into a headspace of the beverage package; and a second piercing element configured for puncturing an outlet opening into the beverage package below a level of beverage contained within the package, the outlet opening being aligned with a dispense end of the dispense nozzle for enabling a direct flow path of beverage for minimising turbulence therethrough toward the delivery vessel. The apparatus may be configured to puncture the vent opening prior to the outlet opening. In one form the first piercing element is a cannular associated with a closeable valve actuated via a biasing element with a resilient force greater than a force required to puncture both the vent opening and outlet opening. In other words, the biasing element may be a spring that only allows the valve to engage to close the cannula when enough force has already opened both vent and outlet.

A corresponding method comprises the sequential steps of: locating and holding a sealed beverage package in a receiving device proximate a dispense nozzle; puncturing a vent into a headspace of the beverage package; and puncturing an outlet into the beverage package, below a level of beverage contained within the package, the outlet being aligned with a dispense end of the dispense nozzle to enable beverage to pour in a direct flow path under gravity through the dispense nozzle for minimising turbulence, into a drinking vessel.

The invention may be embodied, in one form, by a beverage dispense apparatus, comprising: a receiving structure for removably locating and holding a sealed beverage package; a first piercing element configured for puncturing a vent opening into a headspace of the beverage package; and a second piercing element configured for puncturing an outlet opening into the beverage package, below a level of beverage contained within the package; a dispense nozzle for communication with the outlet opening; and an ultrasound generation element for transmitting ultrasound to the beverage. The apparatus may be configured for puncturing the vent opening prior to the outlet opening.

The beverage package is likely a single serve volume for convenience and hygiene reasons, however, it is possible that either a limited number of multiple serves could be dispensed from the package dependent on its internal volume, or multiple single serve packages can be lined up in series for dispense. In one form the receiving means may be expandable (e.g. by a telescoping feature) to adapt to multiple package volumes, as dictated by the length thereof.

Once the package is in place a puncturing device, associated with an actuator, piston or like engagement mechanism, pushes against an end of the beverage package, and is driven through a wall thereof, e.g. an upturned end wall; the package is thereby vented to atmosphere.

In a subsequent step, a puncturing device is engaged at a dispense end of the package to open communication to a dispense nozzle and downstream receiving vessel (e.g. a glass). Optionally, a transducer in communication with a wall of the nozzle imparts ultrasound to the beverage flowing through the nozzle, thereby encouraging bubble nucleation. The ultrasonic signal may be pulsed or continuous during pouring. The expected operating frequency is 30-50 kHz, more preferably 35-45 kHz, most preferably 40 kHz. An alternative ultrasonic delivery device may be employed, such as a probe into the liquid associated with the headspace piercing element.

In an exemplary form the puncturing devices act coaxially on the beverage package, i.e. along a longitudinal axis of the beverage package. One or both of the puncturing devices may be moveable toward the package. The respective puncturing devices may be solid spike/needle type structures and/or a hollow cannula. However, the headspace piercing element does not need to be coaxial with the outlet piercing element. Minimising dispense turbulence is generally achieved by enabling direct flow through the nozzle from the punctured outlet, without abrupt twists/turns in the flow path.

In one form, the beverage package support structure includes a tiltable cradle for mounting a receiving vessel such as a glass. The cradle may be biased to a tilted position and tensioned such that, as beverage is filled under gravity, the glass transitions to an upright position, against the spring bias. The spring bias may be dampened during return to a tilted configuration ready for a next glass to be mounted therein. In this way the dampened return motion prevents a sudden movement of the cradle snapping to a tilted position when the glass is removed for serving.

The invention seeks to optimise dispense from a single serve container of a ready-to-consume beverage by use of a simple vertical-configuration bar-top dispense device, e.g. utilising ultrasound to encourage head formation, while minimising turbulence in the dispensed liquid that may cause large and undesirable bubble formation. In this context "ready-to-consume" means drinkable in that state and where there is no mixing with another liquid prior to dispensing/consuming. In one particular example, the beverage package may contain a stout beer with gas in solution which requires a further step of foam formation to render the beverage most desirable for consumption.

The package requires communication with a dispense end or outlet for enabling egress of beverage. The dispense outlet may be incorporated with (or removable from) a housing or frame associated with the receiving features. The dispense outlet includes a nozzle and a means of puncturing a dispense end of the beverage package, e.g. to open a dispense channel.

According to the invention, there are two puncturing operations relative to the beverage container, namely a first puncturing step to vent the package to atmosphere and a second puncturing step to open dispense. In one form, speed of and a pause in dispense can be controlled by the vent operation. If the vent is closed or narrowed then dispense out of the outlet will stop or slow respectively. This control aspect will enable a two-part pour popular for presentation of a stout beer such as Guinness®. Venting can be controlled by a valve associated with the puncturing device (in the case of it being a hollow cannula) and/or the puncturing device may be controlled to advance and withdraw from the punctured hole to regulate the size of the open vent. Surface features such as indents or channels and/or the bevel angle of the puncturing device may be utilised to determine effective area of the vent and hence enable flow control.

In one broad aspect the invention requires a beverage package to be held between its two ends. Each end is engaged with an engagement portion having a puncturing element and timed such that the uppermost end is punctured first, venting the package, before a lowermost end is punctured to enable delivery by gravity to a vessel.

In one form the first point of puncturing is substantially distant from the second point of puncturing, e.g. at opposite ends of a beverage container. "Distant" should at least be interpreted as the outlet not being at the same end as the vent where, otherwise, leakage could occur.

In one form the outlet puncturing means is a hollow element associated with a nozzle through which flows the ready-to-consume beverage, subjected to ultrasound during dispense, toward a drinking vessel located closely adjacent thereto. In an example not requiring encouragement of a head to form on the poured beverage, the dispense outlet may omit the ultrasound device.

The receiving structure, feature or means, or general enclosure of the apparatus, includes a means of clamping/holding the package in place so that opposite ends may be punctured. Such a clamp may be in the form of a bracket that is dimensioned to receive an upended beverage package (e.g. a roll-formed aluminium can end). In use the receiving structure suspends the beverage package over a vessel to be filled, e.g. a glass, so that beverage can flow in a smooth generally vertical orientation with the assistance of gravity. However, it is possible that the dispense nozzle could be oriented at an angle (from vertical) to direct the beverage in a straight line from the punctured outlet to a waiting vessel offset from the beverage package. In any event, the dispense nozzle should be designed/dimensioned internally so as to minimise pouring turbulence therethrough.

In one aspect the device is expandable/retractable, e.g. for storage and/or for adapting to different beverage package sizes/volumes. Particularly, there is provided a beverage dispense apparatus comprising: a receiving structure for removably locating and holding a sealed beverage package; a first piercing element configured for puncturing a vent opening into a headspace of the beverage package; and a second piercing element configured for puncturing an outlet opening into the beverage package below a level of beverage contained therein; wherein the apparatus (e.g. receiving structure) is configured to be expandable and retractable along a longitudinal axis for accommodating differently sized sealed beverage packages. The expansion and contraction, generally collapsible, feature is suitable for reducing the total height of the device for storage purposes and/or adjusting the device to receiving different heights of beverage container. The apparatus may include a single support strut or multiple support struts/legs, e.g. each of a telescopic nature, to provide height adjustment.

As mentioned, the beverage package is preferably a single serve/unit that, in a conventional sense, is turned upside down (i.e. inverted) for installation into the apparatus. External printing on the package may be correspondingly "upside down" so that the end/dispense end is the "base" of the pack. However, in further embodiments, inversion is not essential as openings can be driven through a package wall regardless of orientation. In some forms it may be found desirable to form an opening through a side wall or shoulder of the package, rather than an end.

The apparatus may be mechanically actuated and/or include an electronic means of controlling/automating timing of package puncture sequence once the beverage package is secured in place. Actuation may also enable fine control of the vent, e.g. by using the first puncturing device as a plug. An example of mechanical actuation may feature resilient bushes (e.g. compressible material and/or springs) locatable against opposite end surfaces of the package that (in use) may provide a sequencing function, e.g. to ensure that a vent to the headspace is first formed through a package wall before introduction of an outlet opening at the other end. Axially advancing cylinders/bushes, e.g. arranged coaxially along a longitudinal axis of the package, may have different deformation properties. An example of electronic engagement may include a motorised actuator at one or each end, e.g. where a vent end puncturing device is driven by a motor, followed by puncturing at the outlet. Outlet puncturing may be driven by another motor or fixed. Equivalent variations will be apparent to a skilled person.

Electronic control via a motor is expected to provide the most consistent delivery option, compared to a manual lever where differing levels of force and capability will be present across different users of the device.

A method of dispensing beverage from a beverage package according to the invention includes the steps of locating and holding a sealed beverage package in a receiving device, opening a vent at a first location of the beverage package, opening an outlet into a second location of the beverage package at a location distant from the first location and dispensing beverage from the beverage package, through the open dispense end, into a vessel. In one form, dispense is performed while subjecting the flowing beverage to ultrasound.

Dispense speed may be controlled at the vent end. Indeed, dispense may be stopped/paused in order to allow a settle time of the beverage before restarting dispense and delivering a final volume. The cross section of the vent may be adjusted/closed to control the volumetric flow of dispense.

DETAILED DESCRIPTION OF THE INVENTION

The following description presents exemplary embodiments and, together with the drawings, serves to explain principles of the invention. However, the scope of the invention is not intended to be limited to the precise details of the embodiments, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner. Directional terms such as "vertical", "horizontal", "up", "down", "upper" and "lower" are used for convenience of explanation usually with reference to the illustrations and are not intended to be ultimately limiting if an equivalent function can be achieved with an alternative dimension and/or direction.

The description herein refers to embodiments with particular combinations of features, however, it is envisaged that further combinations and cross-combinations of compatible features between embodiments will be possible. Indeed, isolated features may function independently as an invention from other features and not necessarily require implementation as a complete combination.

Figure 1:
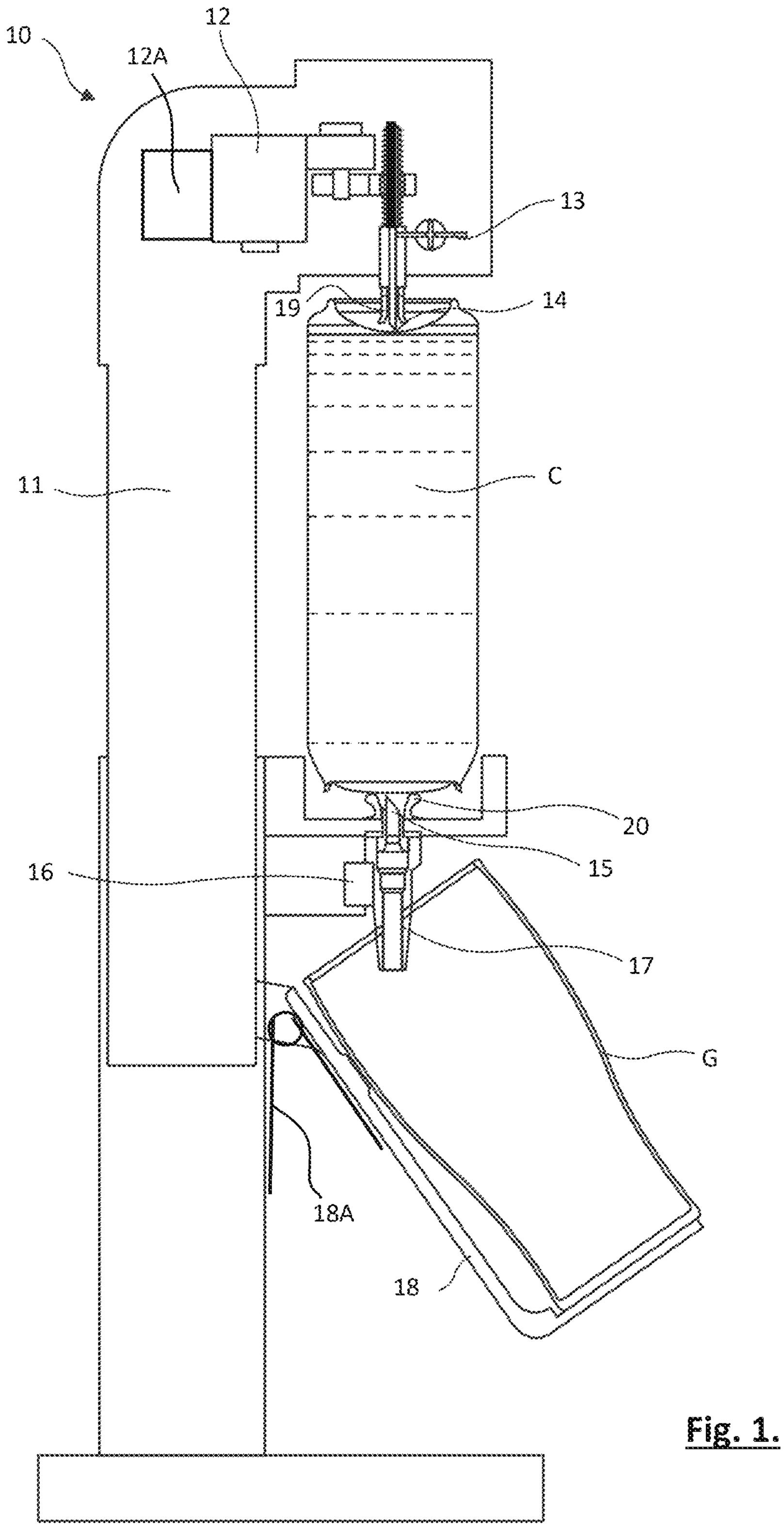
FIG. 1 illustrates a side elevation/section view of a first embodiment of the present invention.

FIG. 1 broadly illustrates a first embodiment of dispense device 10 according to the invention. Functional elements are visible, namely: a support structure/housing 11 comprising a main strut/leg, an actuation mechanism 12, air valve 13, an upper moving cannula and seal assembly 14, a lower fixed cannula and seal assembly 15, ultrasonic transducer 16, nozzle 17, cradle 18. A controller 12A with an electronic circuit is provided to control power to transducer, motor and air valve. A beverage container C is shown in place between cannulas 14/15, held above a glass G within which beverage is ultimately served for consumption. The controller 12A is configured to initiate sequential operation, piercing and venting the upper end f the container prior to actuating the lower cannula assembly 15 for form the beverage outlet.

Figure 2:
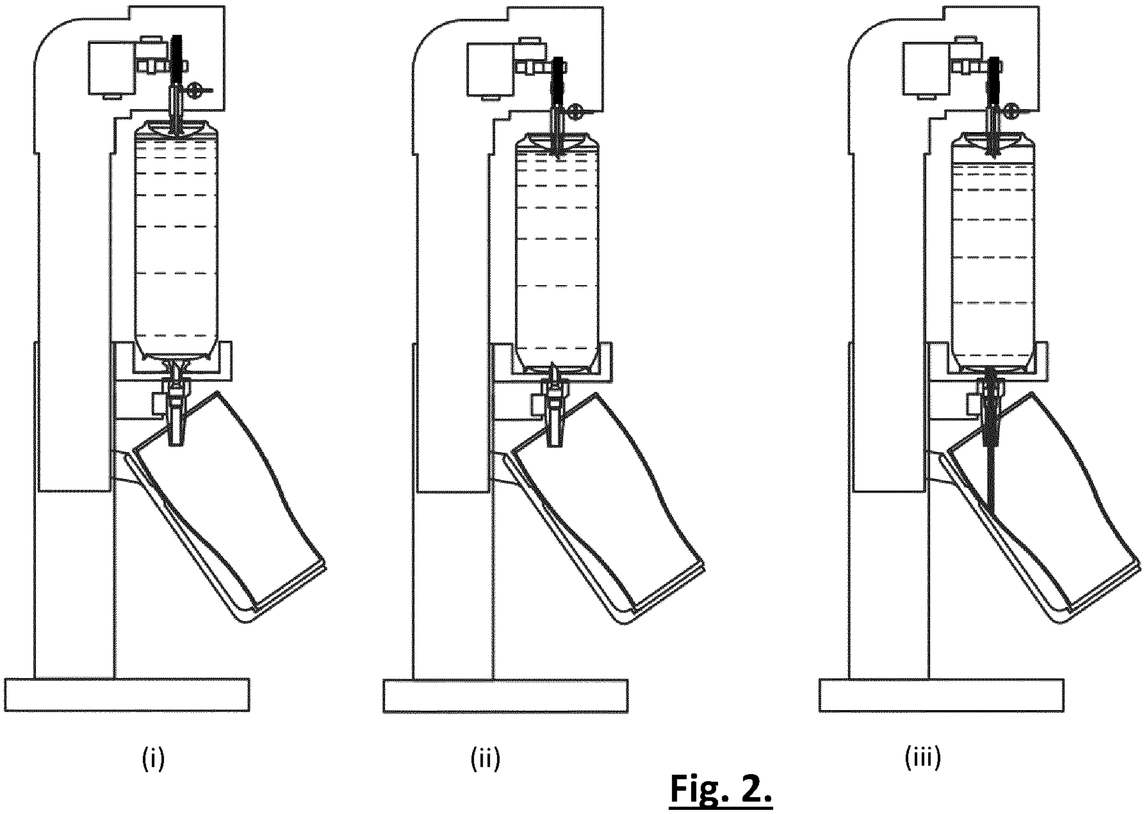
FIG. 2 illustrates a first series of operational filling steps associated with the first embodiment.

FIG. 2 shows a first series of steps (i) to (iii) that exemplify use of the device. Particularly, between steps (i) and (ii) the actuation mechanism 12, triggered by the control circuit (i.e., controller 12A), causes the top cannula 14 to move toward an end of container C. This action pierces the top end of the container C at step (ii), releasing pressure by venting the liquid in the container to atmosphere.

The top cannula, which is surrounded by a deformable bush 19, continues to move downward, pushing the container C downwardly against a second deformable bush 20 and, ultimately, onto upstanding cannula 15 at a dispense end of the device. Continued downward movement causes the bottom end of the container to be pierced by cannula 15 and liquid to flow under atmospheric pressure. It is notable that the liquid flow is substantially laminar (rather than turbulent) due to the open vent into the headspace, enabling air to freely enter without disturbing the liquid. Avoiding turbulent flow is a key consideration for producing a high quality, consistent pour for a stout beer such as Guinness®.

At step (iii) liquid has begun to fall/pour through nozzle 17 into glass G. Liquid flows past the ultrasonic transducer 16 located against nozzle 17 on its journey into glass G. The high frequency vibration of the transducer 16 causes nitrogen to break out of solution in a controlled and efficient manner, producing a "surge" in the glass, such that a desirable head can form after settling.

Figure 3:
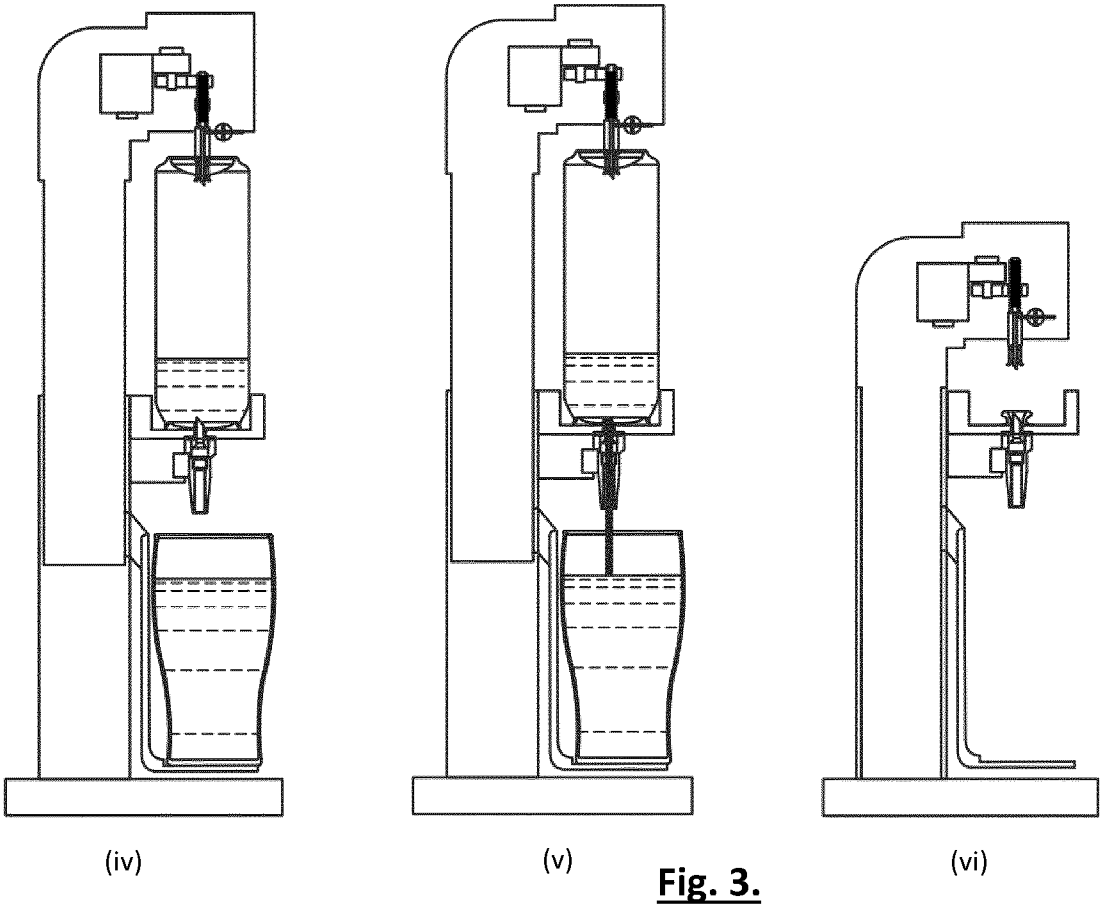
FIG. 3 illustrates a second series of the filling steps associated with the first embodiment.

FIG. 3 illustrates a second series of steps (iv) to (vi). Particularly, between step (iii) and (iv), as the glass G fills, a spring-loaded mechanism associated with cradle 18 slowly pivots from an approximately 45 degree starting position to a vertical position at the end of the first pour. This cradle movement may automatically provide an ideal dynamic incidence angle throughout the pour to avoid liquid turbulence which would detract from the pour quality. In the illustrated form, cradle 18 is biased to a tilted position (via spring 18A as seen in FIG. 1) and the tension in the bias is calculated to support a glass G in a tilted position. As extra weight is added to the glass G via liquid beverage, the bias is overcome and allows a smooth transition to a vertical position. Further, in a preferred form, the natural return bias to a tilt position is dampened to slow the return movement when a glass is removed from cradle 18.

At the end of the first pour, at step (iv), the valve 13 is shut, thereby creating a back pressure in the headspace which slows the liquid flow through nozzle 17. This allows the poured liquid in glass G to settle and a head to form in a familiar way. In an alternative form, where puncturing device 14 has a solid core, the size of the vent (between a zero cross section and an upper size) may be controlled by its movement relative to the hole formed in the package. The puncturing device may have surface features such as indents or channels. In one form the device may have resilient side walls, to provide a sealing function against an edge of the vent hole.

At step (v), after the liquid has settled, the air vent 13 and/or punctured hole may be reopened, allowing the remaining liquid within container C to flow, topping up the glass and recreating a classic two-part draught pour.

When the glass G is removed from the cradle 18, which returns to a tilted position, the system resets in advance of the next dispense cycle.

Step (vi) represents that the height of the structure 11 can be adjusted telescopically to accommodate various beverage container serve sizes. The structure can also be fully retracted when not in use to create a more compact form for storage, providing a particular space-saving advantage for home consumers.

The illustrated form of the invention shows a single strut or leg 11 comprised of telescoping shafts. Alternative forms may feature additional supporting struts/legs, e.g. a two-strut configuration where legs are arranged on opposite sides of the package, for improved stability. Alternative structures may provide an analogous collapsible configuration such as a scissor structure, reciprocating piston, threaded shaft or concertina. The height may be fixed in place by a pin or other braking device. Height may be adjusted by a threaded shaft arrangement in conjunction with or separate from telescoping leg(s).

The beverage container C may be any volume, e.g. a common 440 or 568 mL aluminium can volume as made by numerous suppliers, but preferably with a "blank" can end suitable for being pierced for dispense, i.e. no pull tab. It is noteworthy that orientation of the beverage container (shown "inverted") is arbitrary since suitable engaging features can be built into a new package design or retrofit into more conventional container shapes.

Compression and engagement features of the device may be automated by use of at least one actuator, preferably controlled by a processor/electronics housed within or separately from the main enclosure. Nozzle 17 may be supplied as a removable device with the main unit for cleaning.

It will be apparent from the operational method of the exemplary embodiment that a timed sequence of steps is required for most effective use. The timing of the sequence of piercing the can for dispense and introduction of atmospheric air can be achieved mechanically by an elastomer bushing 19 (or equivalent deformable structure such as a spring-biased telescopic bush with a sealing face in contact with the can end) provided proximate the upper end to create a liquid/airtight seal around piercing element 14 against container C as downward pressure is initiated.

A second elastomer or spring-loaded bushing 20 located proximate to the dispense cannula 15 is provided to create an airtight seal at the bottom end of the device against container C. The deformable bushes 19 and 20 may have different elastomeric properties, so that the venting cannula is engaged first, to form a vent, before dispense cannula 15. In other words, a weak bushing 19 may give way first under a compressive force to engage piercing element 14 downwardly into the top end of container C, while it forms a seal over the opening driven through the end. Headspace pressure escapes via closeable valve 13.

Cannula 15 (in a fixed position) subsequently pierces the base/bottom of container C moving onto it, while bush 20 creates a seal over the dispense opening formed to prevent leakage.

Linear actuation of each spike/cannula 14/15 may be automated by electronic means with separate actuator devices or as a single actuator moving a first cannula against a fixed second cannula. In principle the movement/actuation may originate with the lower part of the device, i.e. where a hard bush 20 surrounding cannula 15 presses container C against a soft bush 19 that deforms and enables piercing by cannula 14, before continued force engages cannula 15 for opening the dispense end.

The exemplary embodiment results in a filled secondary vessel (glass G) where a creamy head forms as a result of gravity flow through an ultrasonically enhanced nozzle 17. It is known in the art that head formation may be improved by a two-step dispense procedure which can be replicated by temporarily closing flow through nozzle 17, via valve 13, and allowing the poured liquid to settle if desired.

Figure 4:
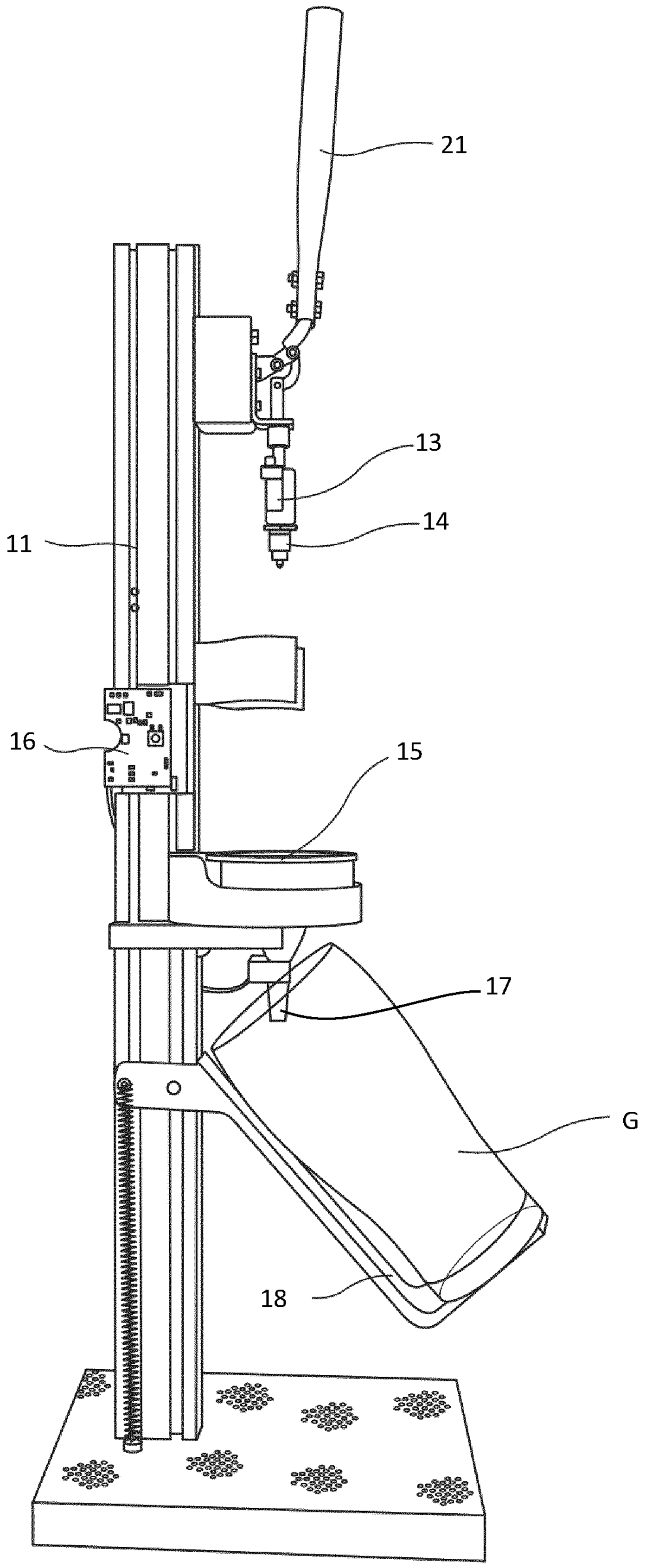
FIG. 4 illustrates a pictorial view of a further embodiment of the present invention.

FIG. 4 illustrates an alternative form of the invention, where the piercing/pouring sequence is manually controlled by actuation of a handle 21. In this form no motorization or strictly electronic control is necessary, but otherwise follows the same general steps that control dispense. For example, handle 21 leverages force onto a piercing/sealing assembly 14 in contact with the upper end of a beverage container (not shown). The container headspace is vented, prior to engagement and puncturing by a dispense end piercing/sealing assembly 15, which occurs naturally by further force applied from lever 21. In this way, lever 21 is a controller which activates sequential operation to pierce/vent an upper end of the beverage container prior to piercing (to form a beverage outlet) of the lower end of the beverage container.

Flow initiates through nozzle 17 and fills glass G. Cradle 18, supporting glass G, is biased toward a tilted position where increasing weight in the filling glass overcomes the bias and begins to move it upright.

A valve 13, in communication with the container headspace, may close the vent and temporarily halt dispense, to allow for settling and head formation. Alternatively or in addition, as previously mentioned, venting and flowrate may be controlled by advancing and withdrawing the first puncturing device to act as a partial or full plug over the vent hole.

In further supplemental forms, a display may provide a visual indicator and/or stepwise guidance to a user operating the device. Such guidance includes a prompt to insert or remove a container and timing information, pouring characteristics and temperature.

It is notable that specific steps/sequence/valve operation executed by firmware, including operating ranges etc., is a useful aspect of the invention. Therefore, an algorithm of steps and associated control may form the basis of an independent invention.

A second motorised embodiment of the invention is illustrated by FIGS. 5 to 9, namely a motorised valve system enabling both ends of a can to be pierced while opening and closing a top valve with one vertical motion. Laminar flow of the liquid can be achieved. In common with previous embodiments, closing of the top valve prevents liquid flow while opening to varying degrees provides accurate open flow control.

Figure 5:
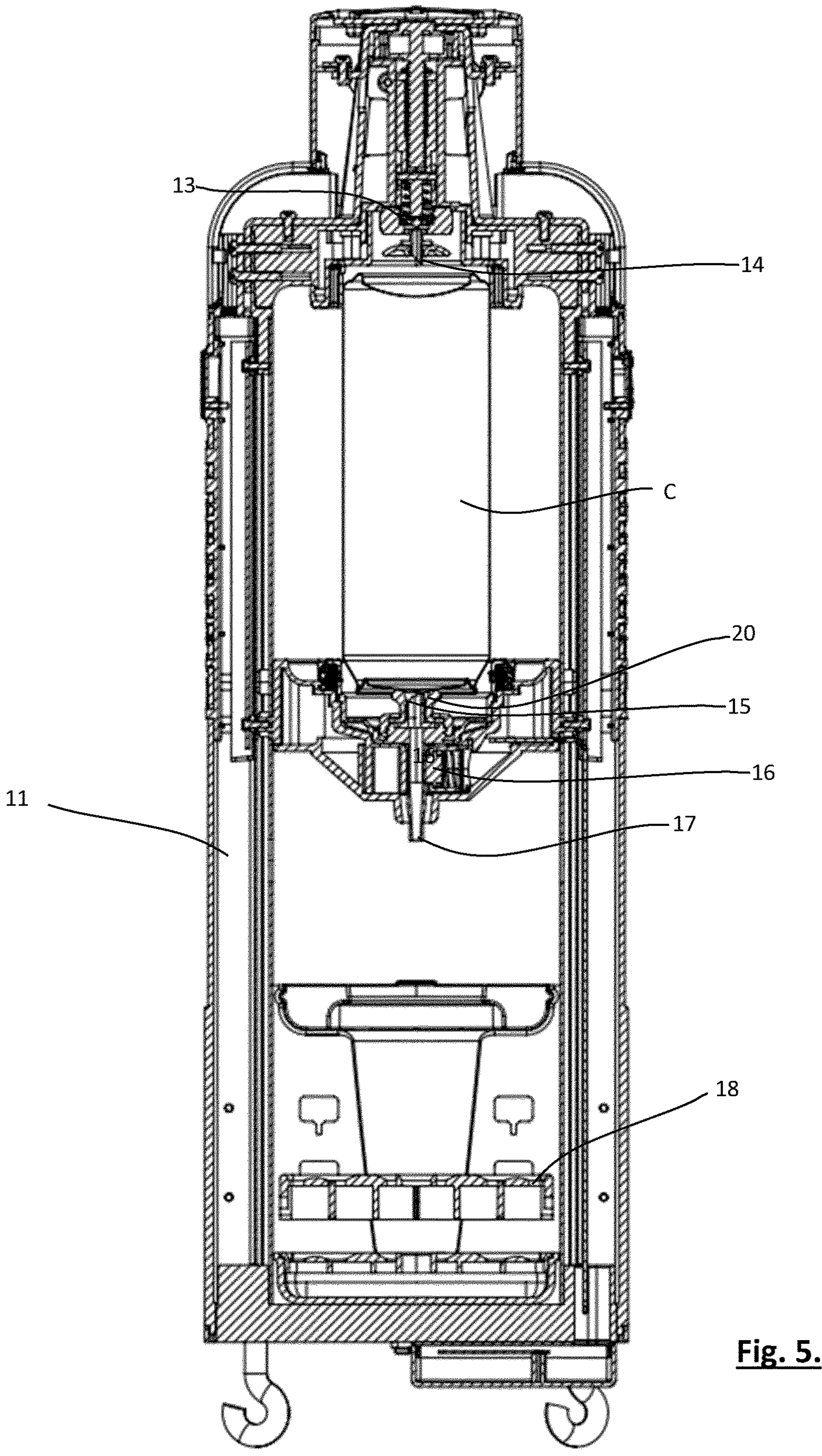
FIG. 5 illustrates a side elevation/section view of a second embodiment of the present invention.
Figure 6:
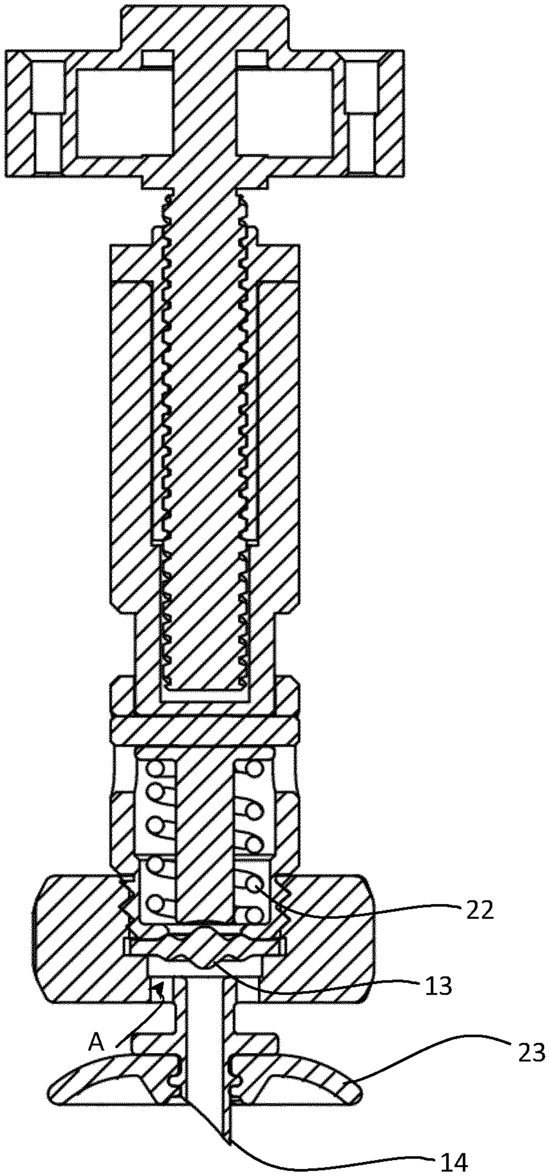
FIG. 6 illustrates a detailed section view of the valve assembly from the second embodiment
Figure 7:
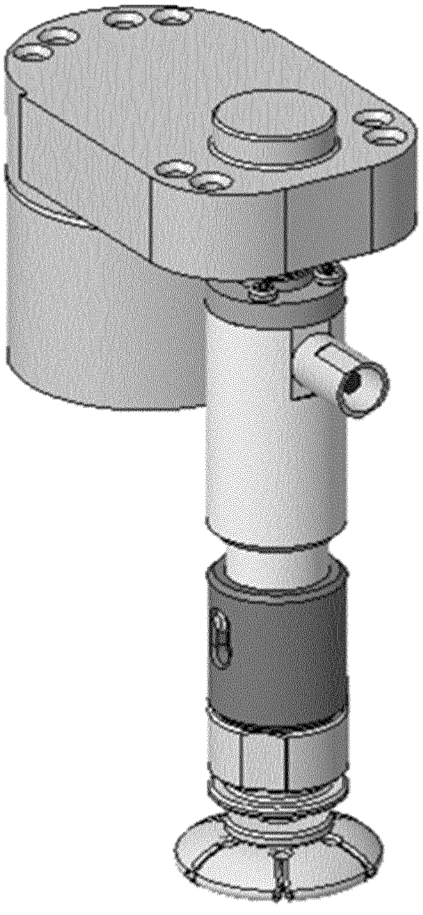
FIG. 7 illustrates an overview of the motor/valve assembly of the second embodiment.

FIG. 5 illustrates components mostly familiar from the first embodiment of FIG. 1, e.g. an actuation mechanism 12, air valve 13, an upper moving cannula and seal assembly 14, a lower fixed cannula and seal assembly 15, ultrasonic transducer 16 and nozzle 17. The embodiment of FIG. 5 features two telescopic legs, either side of the dispense mechanism. As in FIG. 1, the dispenser can be expanded and retracted to adapt to the size of a loaded beverage package (e.g. aluminium can). Further detail of the seal and valve arrangement is provided by FIGS. 6 and 7.

Figure 8:
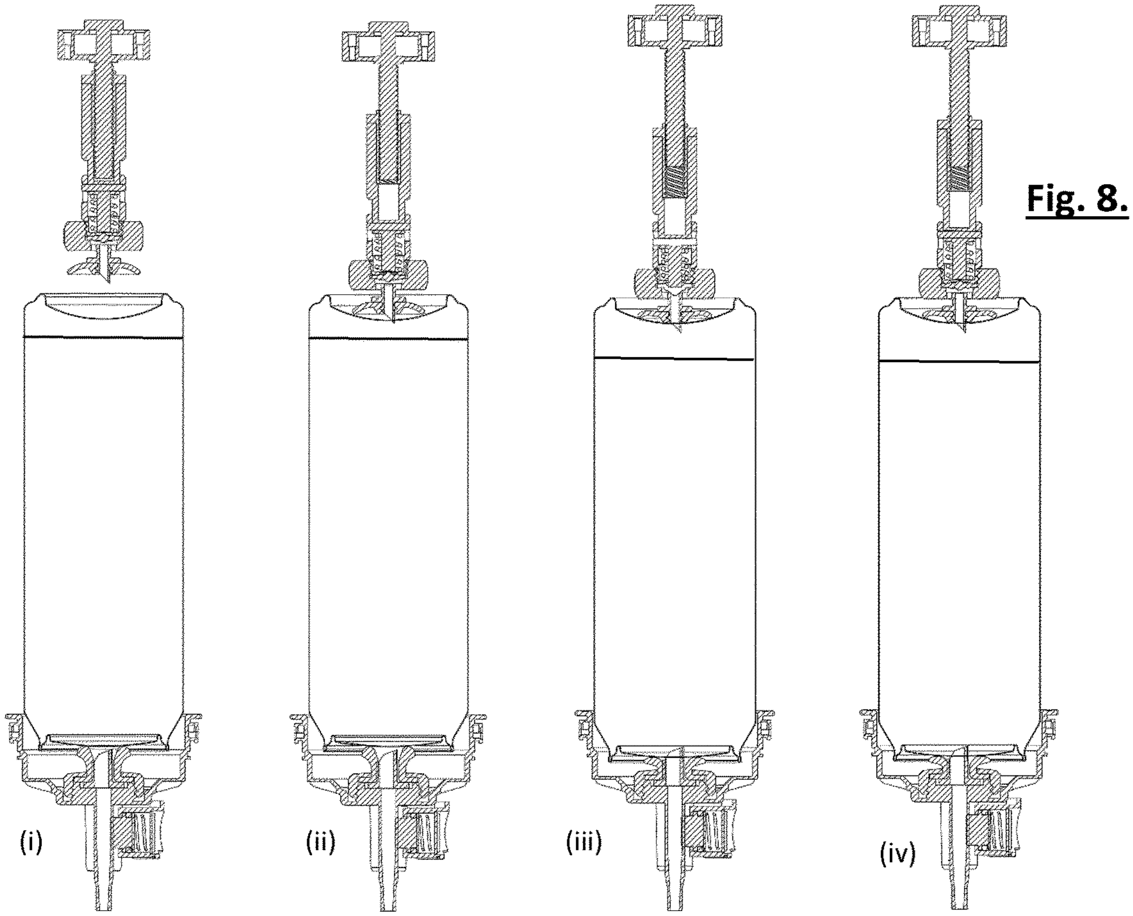
FIG. 8 illustrates a first series of operational filling steps associated with the second embodiment.
Figure 9:
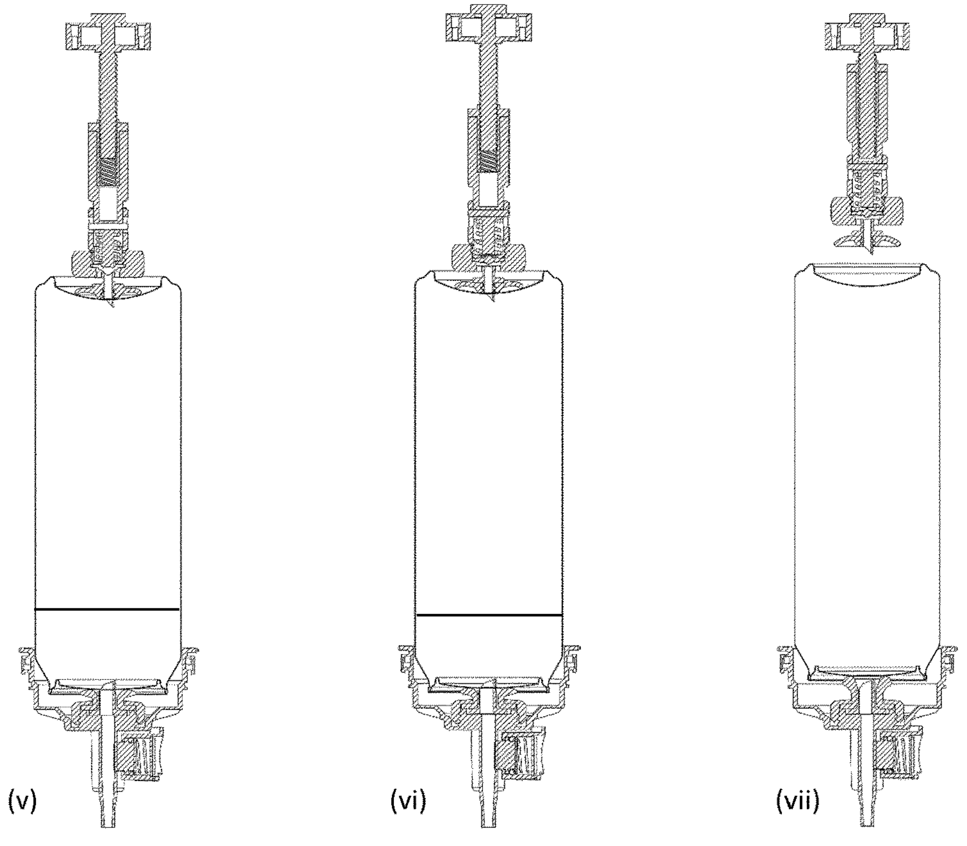
FIG. 9 illustrates a second series of the filling steps associated with the second embodiment.

An operating sequence for the second embodiment is outlined by steps (i) to (vii) of FIGS. 8 and 9. Particularly:

(i) Shows a starting position.

(ii) A motor advances a plunger assembly downwards which in turn drives the top cannula 14 downwards through a spring 22. It keeps advancing until the top cannula pierces the top of the can, releasing pressure and venting the liquid in the can to atmosphere. The spring bias 22 is such that it resists compression while cannula 14 is driven into the can C.

(iii) The motor advances until the top cannula assembly 14 bottoms out, sealing the top cannula to the can via annular flange/skirt 23. As the motor continues to advance it pushes the can C downwards until the bottom cannula 15 pierces through the bottom of the can. At this point the bottom seal 20 is also sealed to the can. As the motor continues to advance, compressing spring 22, the plunger assembly drives downward until the top valve 13 (a pancake shaped diaphragm ordinarily biased toward an open position) is moved to close against an upper channel of cannula 14. This closes airflow to the headspace and creates a vacuum within the can, preventing liquid flow through nozzle 17.

(iv) The motor retracts to pull the plunger upwards opening the top valve 13. This disengages valve 13 from the upper channel of cannula 14 and permits air (see FIG. 6 and airflow denoted A through an opening around cannula) into the can again via cannula, which allows liquid to flow under atmospheric pressure through nozzle 17. It is noteworthy that the liquid flow is laminar (rather than turbulent) as the can has been vented at the top allowing air to freely enter without disturbing the liquid. Liquid flows past the ultrasonic transducer in the nozzle and into glass. Avoiding turbulent flow is a key part of producing a high quality, consistent pour for a nitrogenated beverage using ultrasonics. The high frequency vibration of the transducer causes nitrogen to break out of solution in a controlled and efficient manner, producing a desirable “surge” in the glass, i.e. small bubbles are encouraged, while minimising turbulence discourages large bubble formation that may more quickly collapse a head formed. As the glass fills, the spring-loaded mechanical 18 cradle slowly pivots from a 45-degree starting position to a vertical position at the end of the first pour (better visible in FIGS. 2 and 3). This cradle movement provides the ideal dynamic incidence angle throughout the pour to avoid liquid turbulence which would detract from the pour quality.

(v) At the end of a first pour, the motor advances and the top seal 13 is closed (no airflow A) which slows the liquid flow significantly. This allows the liquid to settle in a glass and a head to form.

(vi) After the liquid has settled, the motor retracts and the top seal is reopened, allowing the remaining liquid to flow topping up the glass. This “two-part” pour is desirable to recreate dispense of some nitrogenated beverage products such as Guinness®.

(vii) Once the glass is removed from the cradle, the can may be ejected. This retracts the top assembly completely allowing any remaining liquid to evacuate and the can to be removed.

It will be apparent that features from the embodiments described herein can be interchangeable or replaced by equivalent features without departing from the scope of the invention.

The method and apparatus according to the present invention as hereinbefore described is advantageous because it is simple to use and can be manufactured in a number of guises using available materials. Ideally the unit will be compact and fit comfortably into a commercial bar type of environment. It provides not only a practical benefit in that the appearance and taste of the beer is enhanced, but also a uniqueness by virtue of the process that may catch the attention of the consumer. A form of the invention may be particularly developed for home use.

The invention can be summarised as an apparatus, system and method for dispensing beverage from a single serve beverage package, e.g. an aluminium can C, particularly for the purpose of forming a head on the beverage poured from said package, although a key objective is to replicate draught dispense in a compact device, minimising cost and quality issues, to be deployed easily. In operation the sealed package C is located and held in a receiving enclosure 11 where, firstly, a headspace end of the package is vented by a piercing element 14 and, secondly, a dispense end is opened for dispense by gravity into a drinking vessel G. An ultrasonic means acts on liquid flowing at the dispense end.

Use of a valve or closure means (e.g. at the headspace vent end, but could alternatively or additionally be at the dispense end) advantageously improves control of beverage delivery to implement a pause to allow a settle time.

An aspect of the invention can also be broadly described as a beverage dispense apparatus and associated method, comprising a frame for removably locating and holding a sealed beverage unit package. A first piercing element punctures a vent opening into a headspace of the beverage package and, subsequently, a second piercing element punctures an outlet opening into the beverage package so that beverage can flow through a nozzle (in communication with the opening) under gravity. An ultrasonic transducer against the nozzle supplies excitation energy that breaks gas out of solution. Accordingly, a creamy head is formed on the beverage in a delivery vessel underneath the frame. A valve, or other form of controlling the vent opening, enables flow to be slowed or stopped enabling a settle time and "two-part" pour.

The invention claimed is:

1. A beverage dispense apparatus, comprising:

a receiving structure for removably locating and holding a sealed beverage package over a delivery vessel;

a dispense nozzle for dispensing beverage therethrough;

a first piercing element configured for puncturing a vent opening into a headspace of the beverage package; and a second piercing element configured for puncturing an outlet opening into the beverage package below a level of beverage contained therein;

wherein the outlet opening is aligned with a dispense end of the dispense nozzle for enabling a direct flow path of beverage, for minimising turbulence therethrough toward the delivery vessel;

a controller configured for initiating a dispense sequence wherein the first piercing element is configured to puncture the vent opening prior to puncturing of the outlet opening by the second piercing element; and wherein the first piercing element is configured to selectively control a duration and/or speed of dispense out of the sealed beverage package.

2. The beverage dispense apparatus of claim 1, including an ultrasound generation element for transmitting ultrasound to the beverage.

3. The beverage dispense apparatus of claim 1, wherein the first piercing element comprises a hollow channel that is in communication with a closeable valve, the closeable valve enabling control of dispense speed out of the sealed beverage package.

4. The beverage dispense apparatus of claim 3, wherein the closeable valve is actuated via a biasing element with a resilient force greater than a force required to puncture both the vent opening and outlet opening.

5. The beverage dispense apparatus of claim 1, wherein the first piercing element is configured to control dispense speed out of the sealed beverage package by advancing and/or withdrawing relative to the vent opening.

6. The beverage dispense apparatus of claim 1, wherein the second piercing element comprises a hollow channel, in communication with the beverage through the outlet opening.

7. The beverage dispense apparatus of claim 1, including a first seal element configured for location over and about the vent opening.

8. The beverage dispense apparatus of claim 7, wherein the first seal element is annular, surrounding the first piercing element.

9. The beverage dispense apparatus of claim 1, including a second seal element configured for location over and about the outlet opening.

10. The beverage dispense apparatus of claim 9, wherein the second seal element is annular, surrounding the second piercing element.

11. The beverage dispense apparatus of claim 1, wherein the controller is electronic for initiating the dispense sequence that forms the vent opening by the first piercing element prior to forming the outlet opening by the second piercing element.

12. The beverage dispense apparatus of claim 11, wherein the controller controls the duration and/or speed of dispense by controlling a motor to actuate the first piercing element and/or by operating a valve to close or restrict airflow through the vent opening.

13. The beverage dispense apparatus of claim 1, comprising a cradle for supporting the delivery vessel underneath the sealed beverage package, wherein the cradle is pivotally mounted and includes a bias element to bias the cradle, with a delivery vessel in place, in a tilted position, being configured to move toward an upright position when beverage fills the delivery vessel.

14. The beverage dispense apparatus of claim 1, wherein the first piercing element is moveable toward the sealed beverage package to form the vent opening and translates compressive force through the sealed beverage package to the second piercing element to form the outlet opening.

15. The beverage dispense apparatus of claim 1, comprising at least one telescopic strut or leg spanning a gap between the first and second piercing elements, configured for collapsing for storage and/or to adjust to the size of the beverage package.

16. The beverage dispense apparatus of claim 1, wherein the sealed beverage package defines a longitudinal axis and at least the second piercing element moves substantially along the longitudinal axis to puncture the outlet opening and in line with the dispense nozzle for dispensing beverage vertically therefrom.

17. The beverage dispense apparatus of claim 1, wherein the controller comprises a manually operated lever configured to initiate the dispense sequence.

18. The beverage dispense apparatus of claim 1, further comprising a manually operated valve in communication with the first piercing element for controlling dispense speed and/or duration.

19. A method of dispensing beverage from a beverage package, including the sequential steps of:

locating and holding a sealed beverage package in a receiving device over and proximate a dispense nozzle;

initiating a dispense sequence by:

puncturing a vent into a headspace of the beverage package by a first piercing element;

puncturing an outlet into the beverage package below a level of beverage contained within the package by a second piercing element; wherein the outlet is aligned with a dispense end of the dispense nozzle to enable beverage to pour in a direct flow path under gravity through the dispense nozzle for minimizing turbulence, into a drinking vessel;

selectively controlling the first piercing element to control at least one of a duration or speed of dispense out of the sealed beverage package into the drinking vessel.

20. The method of dispensing beverage of claim 19, including the step of applying ultrasonic excitation to the beverage.

21. The method of dispensing beverage of claim 20, wherein the ultrasonic excitation is applied at the nozzle.

22. The method of dispensing beverage from a beverage package according to claim 19, wherein a dispense flow rate is controlled by adjusting the effective vent size between zero and a maximum.

* * * * *